United States Patent Office 3,493,589
Patented Feb. 3, 1970

3,493,589
NOVEL STEROIDAL STEAROYL GLYCOLYL ESTERS
Timothy Y. W. Jen, Delaware, Pa., assignor to American Home Products Corporation, New York, N.Y., a corporation of Delaware
No Drawing. Filed Nov. 17, 1966, Ser. No. 595,032
Int. Cl. C07c *169/12, 167/28;* A61k *17/06*
U.S. Cl. 260—397.5         5 Claims

ABSTRACT OF THE DISCLOSURE

17α-alkyl or alkynyl-gonene - 3,17 - diol-3-3-glycolate stearates are produced which have been found useful as long-acting progestational agents.

---

This invention relates in general to steroidal stearoyl glycolyl esters and more specifically to 17α-alkyl or alkynyl-gonene-3,17-diol-3-glycolate stearates and their preparation. The invention also relates to compositions having useful pharmacological activity.

Compounds of the invention may be represented by the following structural formula:

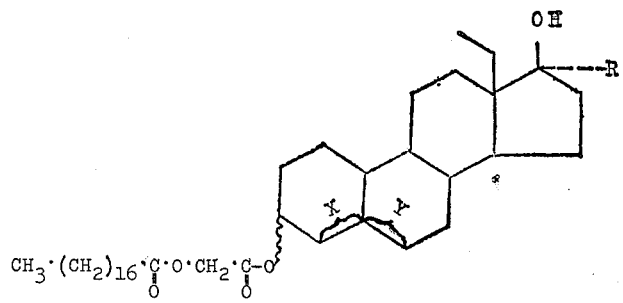

in which R represents a lower alkyl, preferably ethyl, a lower alkynyl, preferably ethynyl, or a halo-substituted lower alkynyl, preferably chloroethynyl. The symbols X and Y are intended to represent either a saturated single or double bond in the 4- or the 5-positions but always dissimilar in the sense that when one is a single bond, the other is a double bond. The ester bond in the 3-position is shown as a wavy line to represent a generic expression for an α- or β-configuration or mixtures thereof at this position.

Compounds falling within the scope of the above designated formula have been found to possess hormonal activity, as relatively long acting compounds of the progestational type. Surprisingly it has been found that a single injection of a compound of the invention within the range of 0.1 to 2.0 mg. per kilogram of body weight will cause histologic changes in the uterus a month after the injection, specifically, changes which are otherwise observed only in pregnancy. The compounds are consequently useful as long-acting progestational agents. The compounds are also useful pharmacologically for comparative, experimental purposes in the hormonal field.

The compounds of the invention may be used directly or made up in composition form combined with relatively inert diluents, excipients, extenders or carriers or with suspending agents. Additionally, they may be combined with other active hormonal agents. The compounds of the invention are useful as intermediates, for example, in reactions involving the preparation of hormonal steroids in which the alkynyl group is reduced to an alkenyl or an alkyl group or where the 17-hydroxyl is chemically modified to a keto or an ester group by known procedures.

Preparation of the compounds is carried out by reacting a selected 13-alkyl-17α-alkyl, alkynyl or substituted alkynyl-gonene-3,17β-diol with a molar excess of glycolyl chloride stearate in a suitable solvent such as dioxane alone or mixed with pyridine. The reaction is carried out at room temperature.

The starting materials are known compounds, and, as far as the steroidal reactant is concerned, it may be prepared as taught by Smith et al., Jour. Chem. Soc., November 1964, pages 4472–4492.

The invention may be illustrated in greater detail by the following examples, but these are not to be construed as limitative of the scope of the invention. Temperatures as given in the examples are to be understood as being in degrees centigrade.

EXAMPLE 1 dl-13-ethyl-17α-ethynylgon-4-ene-3β,17β-diol
3-(glycolate stearate)

To a solution of 2.93 g. (0.01 mole) of dl-13-ethyl-17α-ethynyl-gon-4-ene-3β,17β-diol in 100 ml. of anhydrous dioxane was added 0.95 g. (0.012 mole) of freshly prepared glycolyl chloride stearate in 50 ml. of dioxane. The mixture was then stirred at room temperature for 72 hrs. It was diluted with chloroform, and washed with 2% hydrochloric acid, brine, sodium bicarbonate solution and brine (3X). After drying ($Na_2SO_4$), the solvent was removed under reduced pressure and the last part of the solvent (dioxane) was removed in vacuo. The gummy residue solidified on scratching with methanol to furnish 3.8 g. of the title product, M.P. 75–80°. It was chromatographed on 100 g. of fuller's earth (Florex). From benzene fractions, there was obtained 3.05 g. of the pure product which had M.P. 77–80°, $\lambda_{max.}^{KBr}$ 2.91, 3.10, 5.76μ

*Analysis.*—Calc'd for $C_{41}H_{66}O_5$: C, 77.07; H, 10.41%. Found: C, 77.29; H, 10.67%.

EXAMPLE 2 dl-13-ethyl-17α-(chloroethynyl)-gon-4-ene-
3β,17β-diol,3-(glycolate stearate)

To a solution of 1.865 g. (0.00534 mole) of dl-13-ethyl-17α-(chloroethynyl)-gon-4-ene-3β,17β-diol in 60 ml. of anhydrous dioxane and 0.505 g. (0.0064 mole) of pyridine, there was added a solution of 2.30 g. (0.0064 mole) of freshly prepared glycolyl chloride stearate in 40 ml. of dioxane and the mixture was stirred at room temperature for 72 hrs. It was diluted with chloroform and after the work-up as described in Example 1, there was obtained 3.3 g. of the crude title product, M.P. 72–76° (homogenous on TLC plate). A sample (0.8 g.), was recrystallized from methanol to give the analytical sample (0.25 g.) which had M.P. 77–80°, $\lambda_{max.}^{KBr}$ 2.91, 4.55, (weak) 5.78μ

*Analysis.*—Calc'd for $C_{41}H_{65}O_5$ Cl requires: C, 73.12; H, 9.73; Cl, 5.26%. Found: C, 72.93; H, 9.87; Cl, 5.09%.

Further cooling of the mother liquor gave 0.23 g. of product, M.P. 76–78°.

EXAMPLE 3 dl-13,17α-diethylgon-4-ene-3β,17β-diol,
3-(glycolate stearate)

A solution of 1.506 g. (0.00475 mole) of dl-13,17α-diethylgon-4-ene-3β,17β-diol in 50 ml. of anhydrous dioxane and 0.45 g. (0.0057 mole) of pyridine was treated with 2.05 g. (0.0057 mole) of freshly prepared glycolyl chloride stearate in 35 ml. of dioxane at room temperature for 72 hrs. It was worked up in similar manner previously described to a gum which was dissolved in benzene and passed through a column of fuller's earth (Florex) to remove the starting material. The title product (0.9 g.) was obtained as a gum which gave a single spot on TLC plate. The analytical sample, dried at 60° in vacuo overnight, had $\lambda_{max.}^{film}$ 2.87, 5.72 (broad) μ

*Analysis.*—Calc'd for $C_{41}H_{70}O_5$: C, 76.58; H, 10.97%. Found: C, 76.28; H, 10.79%.

EXAMPLE 4 dl-13-ethyl-17α-ethynylgon-5-ene-3ξ, 17β-diol,3-(glycolate stearate)

A solution of 1.5 g. (0.00478 mole) of dl-13-ethyl-17α-ethynylgon-5-ene-3ξ, 17β-diol in 50 ml. of anhydrous dioxane and 0.566 g. (0.00717 mole) of pyridine was treated with 2.58 g. (0.00717 mole) of freshly prepared glycolyl chloride stearate in 35 ml. of dioxane at room temperature for 72 hrs. After the usual work-up, there was obtained a gum which slowly solidified on hexane. It was indicated on thin layer chromatogram that this material consisted of mainly the starting diol (a mixture of 3α and 3β-alcohols) and a small amount of the expected product. The unreacted starting material was removed by passing this mixture in benzene through fuller's earth (Florex). The resultant solid material (low melting) gave a single spot on TLC plate. The NMR spectrum of the starting material indicated that it was solvated as ethanolate (1 mole). The consumption of glycolyl chloride stearate to for the corresponding ethanol ester was expected, and this ester did not produce color reaction on the TLC plate. This was verified by absorbing this material (1.5 g.) in a column of fuller's earth (Florex) in hexane. Elution with benzene-hexane (1:4) gave the ethanol ester of glycolic acid stearate as a waxy solid. Elution with benzene gave the title product (485 mg.) as crystalline material which had M.P. 73–75°, $\lambda_{max.}^{KBr}$ 2.95, 3.10, 5.70μ

*Analysis.*—Cal'd for $C_{41}H_{66}O_5$: C, 77.07; H, 10.41%. Found: C, 77.13; H, 10.26%.

I claim:
1. A compound having the formula:

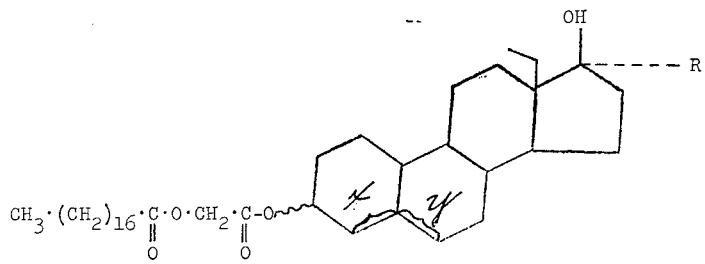

in which the R is a member of the group consisting of ethyl, ethynyl and chloroethynyl, while X and Y are dissimilar and are selected from the group consisting of a saturated linkage and a double bond.

2. As a compound of claim 1; dl-13-ethyl-17α-ethynyl-gon-4-ene-3β,17β-diol,3-(glycolate stearate).

3. As a compound of claim 1, dl-13-ethyl-17α-(chloroethynyl)-gon-4-ene-3β,17β-diol,3-(glycolate stearate).

4. As a compound of claim 1; dl-13,-17α-diethylgon-4-ene-3β,17β-diol,3-(glycolate stearate).

5. As a compound of claim 1; dl-13-ethyl-17α-ethynyl-gon-5-ene-3ξ,17β-diol,3-(glycolate stearate).

References Cited

UNITED STATES PATENTS 3,131,125   4/1964   Wettstein et al. _____ 167—65
3,264,287   8/1966   Wettstein et al. ___ 260—239.55

HENRY A. FRENCH, Primary Examiner

U.S. Cl. X.R.
260—999